July 7, 1936.  W. E. SACKNER  2,046,415
HANDLE FOR CONFECTION
Filed Feb. 10, 1933
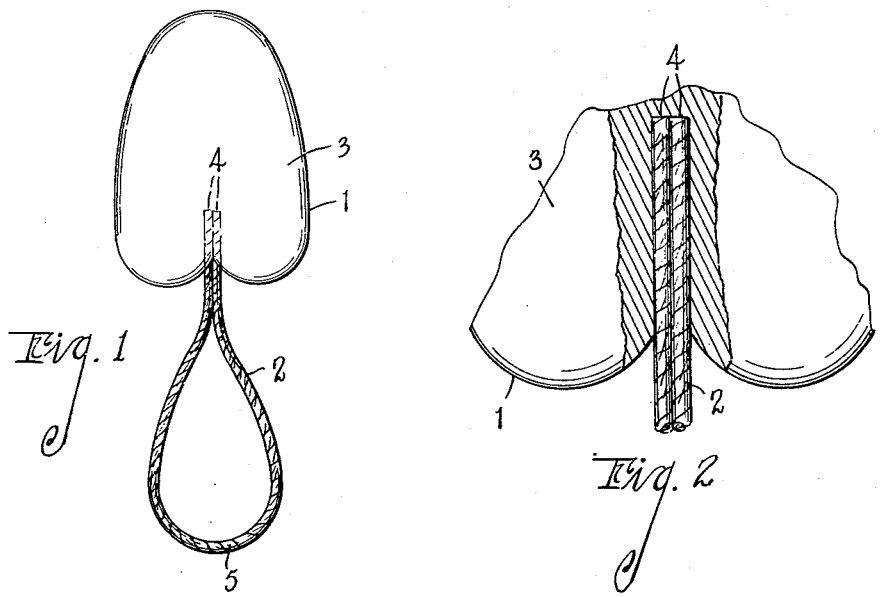
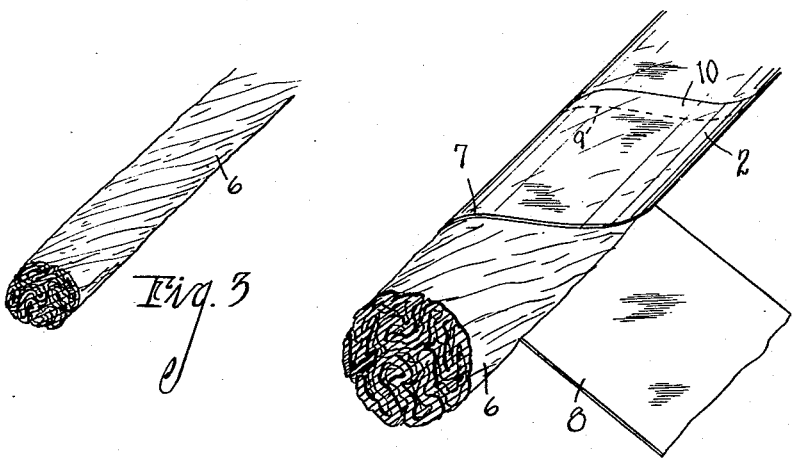
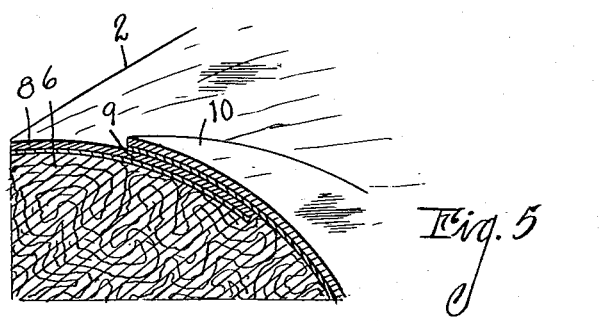
INVENTOR
Wade E. Sackner
BY
ATTORNEYS Patented July 7, 1936

2,046,415

UNITED STATES PATENT OFFICE 2,046,415

HANDLE FOR CONFECTION

Wade E. Sackner, Grand Rapids, Mich., assignor to Grand Rapids Fibre Cord Company, Grand Rapids, Mich.

Application February 10, 1933, Serial No. 656,189

1 Claim. (Cl. 99—138)

The main objects of this invention are:

First, to provide a safe and inexpensive handle for a lolly-pop or like confection that is ordinarily supported on a stick or the like.

Second, to provide a handle suitable for use on a lolly-pop comprising a twisted paper cord loop with its ends embedded in the confection, which handle is waterproofed by the application of a Cellophane cover that also cooperates to lend the desired degree of rigidity to the handle so that the confection being eaten can be supported sufficiently while at the same time providing a comparatively flexible handle that will give in case the handle is struck while the confection is in the mouth of the consumer.

Third, to provide such a handle that is smooth, water-proof, and attractive in appearance, and which can be made in a variety of colors which will be unaffected by saliva or other moisture that may get on the handle.

Objects pertaining to details and economies of my invention will appear from the description to follow. The invention is defined in the claim.

A device embodying the features of my invention is illustrated in the accompanying drawing, in which:

Fig. 1 is a view of a lolly-pop with my improved handle.

Fig. 2 is a partial view in detail showing the handle embedded in the confection.

Fig. 3 is a view of a twisted paper cord for use in my invention.

Fig. 4 is a view of the cord of Fig. 3 during the process of covering with a Cellophane strip.

Fig. 5 is a partial detail sectional view of the covered cord.

I am aware that flexible handles have been used on lolly-pops or like confections which have formerly been usually supported on rigid sticks of wood or the like, and my invention is a specific improvement upon such handles.

I is a lolly-pop or similar confection to be eaten from a supporting member or handle 2, the confection being shown at 3. The handle shown is a twisted cord loop with its ends 4 embedded in the confection 3 and its body portion forming a loop 5 to be held by the consumer.

The cord comprises an inner core 6 which may be of twisted paper or any suitable cord construction. The core 6 may be made of sufficient rigidity to hold up the confection while it is being eaten and of flexibility such that the user will not be injured when some force is applied to the stick while the confection is in or near his mouth.

In the preferred form of the invention the core 6 is not of sufficient rigidity and is reinforced and water-proofed by a Cellophane wrapping 7 which consists of a strip 8 of Cellophane that is tightly wound on the cord with its edges overlapping as shown in Fig. 5 to present a smooth nice appearing surface.

"Cellophane" referred to here is a well known product.

This cord and method of making same is described in my copending application for Letters Patent filed concurrently herewith, which application has eventuated in Patent 2,021,331, issued November 19, 1935.

The core 6 is of such size, for purposes of economy and for purposes of obtaining the most desirable structure, that until the Cellophane covering 7 is applied it is not sufficiently rigid to serve the purpose for which it is applied to the confection. In making the cord the core 6 is coated with a suitable waterproof cement that may be purchased in the open market. The strip 8 is then wrapped tightly around the core as shown in Fig. 4, and is cemented to the core by the cement thereon. Enough cement is left on the core so that as the wrapping takes place the cement is forced out between the overlapping edges 9 and 10 of the Cellophane whereby these overlapping edges are cemented together.

The resulting handle may be made of any desired color by using any desired color of paper or cord for the core 6; the Cellophane used being the cheaper transparent water-proof variety, the color shows through giving a handle of desired color with the color protected from saliva and like moisture by means of waterproof covering.

In using the twisted paper cord such as the core 6 as a handle for lolly-pops the paper becomes soaked up with saliva and the structure is not completely satisfactory. My invention removes this difficulty and permits the use of a smaller paper cord of any desired color.

The paper cord with the waterproof viscose covering is inserted in the confection of the lolly-pop in the conventional manner, that is, the confection which is ordinarily a type of hard candy is made in desired form and while the confection is still warm and plastic the ends of the cord loop are inserted into the confection. The particular waterproof coating prevents the moisture which ordinarily collects in paper cord, from being driven from the cord because of the necessary heat of the confection. Without this covering, considerable care must be taken because the warmth of the confection will convert the moisture in the cord to steam, causing it to bubble out and prevent the proper setting of the confection around the handle.

While I have specifically described my invention as applicable to lolly pops and wish to claim it thus specifically, it is clear that the handle is capable of use in handling ice cream confections and can be used wherever a handle is desired or required for the supporting of a portion of food or confection. The cord may be of any desired cross section, but of course is most conveniently produced as a round cord.

Having thus described my invention what I claim as new and desire to secure by Letters Patent is:

The method of producing a lolly-pop having a handle sufficiently rigid to hold up the confection of the lolly-pop while it is being eaten but sufficiently flexible to give under compression forces likely to be applied while the confection is being eaten, comprising producing a paper cord, wrapping said paper cord with a waterproof viscose strip having its edges overlapping and cementing said viscose strip to said cord and to itself at the overlapping portions, forming a loop of the cord and inserting the ends of the cord in the confection when it is still soft and has not set, whereby the waterproof viscose covering on the cord tends to prevent the passage of moisture from the cord to the confection prior to the setting and hardening thereof, and allowing the confection to set.

WADE E. SACKNER.